United States Patent
Lee et al.

(10) Patent No.: US 8,566,690 B2
(45) Date of Patent: Oct. 22, 2013

(54) APPARATUS AND METHOD FOR ASSESSING IMAGE QUALITY IN REAL-TIME

(75) Inventors: Ho Yeon Lee, Gyunggi-do (KR); Hyun Woo Lee, Daejeon (KR); Won Ryu, Daejeon (KR); Dong Gyu Sim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 492 days.

(21) Appl. No.: 12/966,562

(22) Filed: Dec. 13, 2010

(65) Prior Publication Data

US 2011/0154172 A1 Jun. 23, 2011

(30) Foreign Application Priority Data

Dec. 18, 2009 (KR) .................. 10-2009-0127521

(51) Int. Cl.
*H04N 7/64* (2006.01)
(52) U.S. Cl.
USPC ..................................... 714/811; 375/240.27
(58) Field of Classification Search
USPC ..................................... 714/811; 375/240.27
See application file for complete search history.

(56) References Cited

U.S. PATENT DOCUMENTS

| 5,510,839 | A  | * | 4/1996  | Hamano et al. .......... 375/240.16 |
| 5,768,533 | A  | * | 6/1998  | Ran .............................. 709/247 |
| 6,385,343 | B1 | * | 5/2002  | Kuroda et al. ................ 382/233 |
| 6,513,162 | B1 | * | 1/2003  | Honda ........................... 725/96 |
| 6,591,396 | B1 | * | 7/2003  | Honda .......................... 714/798 |
| 6,741,569 | B1 | * | 5/2004  | Clark ............................ 370/252 |
| 7,061,863 | B2 | * | 6/2006  | Watanabe et al. ............. 370/232 |
| 7,215,712 | B2 | * | 5/2007  | Katsavounidis et al. 375/240.28 |
| 7,289,168 | B2 | * | 10/2007 | Yoshizawa et al. ........... 348/738 |
| 7,319,698 | B2 | * | 1/2008  | Higashigawa et al. ....... 370/394 |
| 7,327,791 | B1 | * | 2/2008  | Sekiguchi et al. ....... 375/240.27 |
| 7,408,991 | B2 | * | 8/2008  | Hourunranta ............ 375/240.24 |
| 7,499,475 | B2 | * | 3/2009  | Kashiwagi et al. ........... 370/538 |
| 7,738,561 | B2 | * | 6/2010  | Huang et al. ............. 375/240.27 |
| 8,027,381 | B2 | * | 9/2011  | Boyce et al. ............. 375/240.01 |
| 2009/0096874 | A1 |  | 4/2009  | Hayashi et al. |

FOREIGN PATENT DOCUMENTS

| KR | 1020050024098 | 3/2005 |
| KR | 1020080028483 | 3/2008 |

* cited by examiner

*Primary Examiner* — Stephen M Baker
(74) *Attorney, Agent, or Firm* — Nelson Mullins Riley & Scarborough LLP (57) ABSTRACT

An apparatus and method for assessing image quality in real-time in consideration of both a coding error generated in an image processing process and a packet error generated in an image transmission process are provided. The apparatus for assessing image quality in real-time includes: an image quality measurement unit measuring image degradation generated in processing an image; a packet degradation detection unit detecting a packet error generated in transmitting the image; and final outcome drawing unit finally assessing the quality of the image in consideration of both a degradation degree of the image measured by the image quality measurement unit and the packet error measured by the packet degradation detection unit.

16 Claims, 6 Drawing Sheets

APPARATUS AND METHOD FOR ASSESSING IMAGE QUALITY IN REAL-TIME

CROSS-REFERENCE TO RELATED APPLICATIONS

This application claims the priority of Korean Patent Application No. 10-2009-0127521 filed on Dec. 18, 2009, in the Korean Intellectual Property Office, the disclosure of which is incorporated herein by reference.

BACKGROUND OF THE INVENTION

1. Field of the Invention

The present invention relates to an apparatus and method for assessing quality of a transmitted image in real-time and making the assessed image quality have an optimum association with subjective image quality assessment by a plurality of people.

2. Description of the Related Art

While the development of and demand for a technique for transmitting and receiving an image in real-time, such as Internet Protocol Television (IPTV), have arithmetically (or geometrically) increased, a technique for assessing and verifying the performance of such a technique has relatively lagged behind.

Currently, the quality of an image transmitted in real-time is largely assessed by a subjective method relying on the naked eye.

However, such a subjective method is restricted in its applicability due to various problems such as time, space, cost, and the like, and it is impossible to perform processing in real-time, the most important requirement for assessing video quality of service (QoS).

SUMMARY OF THE INVENTION

An aspect of the present invention provides an apparatus and method for assessing quality of a transmitted image in real-time.

Another aspect of the present invention provides an apparatus and method for assessing image quality in real-time in consideration of an error generated during an image processing process and an error generated during an image transmission process, thus making the assessed image quality have an optimum association with subjective image quality assessment by a plurality of people.

According to an aspect of the present invention, there is provided an apparatus for assessing image quality in real-time, including: an image quality measurement unit measuring image degradation generated in processing an image; a packet degradation detection unit detecting a packet error generated in transmitting the image; and a final outcome drawing unit finally assessing the quality of the image in consideration of both a degradation degree of the image measured by the image quality measurement unit and the packet error measured by the packet degradation detection unit.

The image quality measurement unit may include: an image segmenting unit obtaining a residual absolute value of each pixel from the image and segmenting the same into $2^m$ number of samplings (m is a natural number of 2 or greater); an image conversion unit converting the segmented signals output from the image segmenting unit into signals of a frequency domain; and a degradation degree measurement unit measuring a degradation degree of each pixel through the converted signals output from the image conversion unit and averaging the same to measure a degradation degree of the image.

The image conversion unit may perform a Fourier transform on each of the sampling signals to convert the signal domain of the segmented signal from the image domain to a frequency domain.

The degradation degree measurement unit may accumulate the converted signals by pixel, measure a degradation degree of each pixel through the amplitude of the accumulated signals at a point corresponding to $2^m$, and average them to determine a degradation degree of the image.

The packet degradation detection unit may include: a block segmenting unit segmenting the image into a plurality of blocks; an error block detection unit detecting a block having an error among the plurality of blocks; and an error block analyzing unit acquiring and outputting an error block pixel value distribution and the number of error blocks when a generation pattern of the error blocks detected by the error block detection unit corresponds to an error generation pattern caused by a packet error.

The error block detection unit may detect a block in which the difference in a pixel value average between an inner boundary and an outer boundary is greater than a detection reference value compared with the difference in a pixel value average between the inner boundary and an inner area, and acquire the detected block as an error block.

The error block detection unit may detect a block in which a pixel value distribution corresponding to an outer boundary having the same size as that of an inner boundary is greater than a detection reference value compared with a pixel value distribution corresponding to an inner area having the same size as that of the inner boundary, and acquire the detected block as an error block.

The error block detection unit may detect a block in which a pixel value distribution is greater than the detection reference value and the pixel value distribution and a pixel value average are the same as those of a neighboring block, and acquire the detected block as an error block.

The error block analyzing unit may check the number of error blocks by row and by column and acquire an error block pixel value distribution with respect to the entire rows and entire columns, and when the error block pixel value distribution is included in a packet error detection range, the error block analyzing unit may determine that an image has been degraded due to a packet error, acquire the number or error blocks, and output the same.

According to another aspect of the present invention, there is provided a method for measuring image quality in real-time, including: measuring image degradation generated in processing an image; detecting a packet error generated in transmitting the image; and finally assessing the quality of the image in consideration of both a degradation degree of the image and the packet error.

The measuring of the image degradation may include: obtaining a residual absolute value of each pixel from the image, sampling the residual absolute value of each pixel into $2^m$ number of values (m is a natural number of 2 or greater), and converting the same into signals of a frequency domain; and measuring a degradation degree of each pixel from the signals which have been converted into the frequency domain and averaging them to acquire a degradation degree of the image.

The detecting of the packet error may include: segmenting the image into a plurality of blocks and detecting an error block; and when a generation pattern of the error blocks corresponds to an error generation pattern due to a packet error, acquiring an error block pixel value distribution and the number of error blocks, and outputting the same.

The detecting of the error block may include: obtaining a pixel value average of each of an inner area, an inner boundary area, and an outer boundary area of each block; obtaining a pixel value average of each of an inner area, an inner boundary area, and an outer boundary area of each block; comparing the difference in the pixel value average between the inner boundary area and the outer boundary area and the difference in the pixel value average between the inner boundary area and the inner area, and detecting a block having a difference greater than a detection reference value; and acquiring the detected block as an error block.

The detecting of an error block may include: acquiring a pixel value distribution corresponding to an outer boundary area having the same size as that of the inner boundary area and a pixel value distribution corresponding to an inner area having the same size as that of the inner boundary area, among the inner area, the inner boundary area, and the outer boundary area by block; comparing the pixel value distribution corresponding to an outer boundary area having the same size as that of the inner boundary area and the pixel value distribution corresponding to an inner area having the same size as that of the inner boundary area to detect a block in which the pixel value distribution is greater than a detection reference value; and acquiring the detected block as an error block.

The detecting of the error block may include: obtaining a pixel value distribution included in a detection target block; when the distribution is grater than the detection reference value, obtaining a pixel value distribution and a pixel value average of the detection target block and comparing them with a neighboring block; and when the obtained pixel value distribution and the pixel value average of the detection target block are similar to the neighboring block, detecting the detection target block as an error block.

The detecting of the error block may be repeatedly performed by column and row of the entirety of an image.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

It will be understood that when an element is referred to as being "connected with" another element, it can be directly connected with the other element or intervening elements may also be present. In contrast, when an element is referred to as being "directly connected with" another element, there are no intervening elements present.

Figure 1:
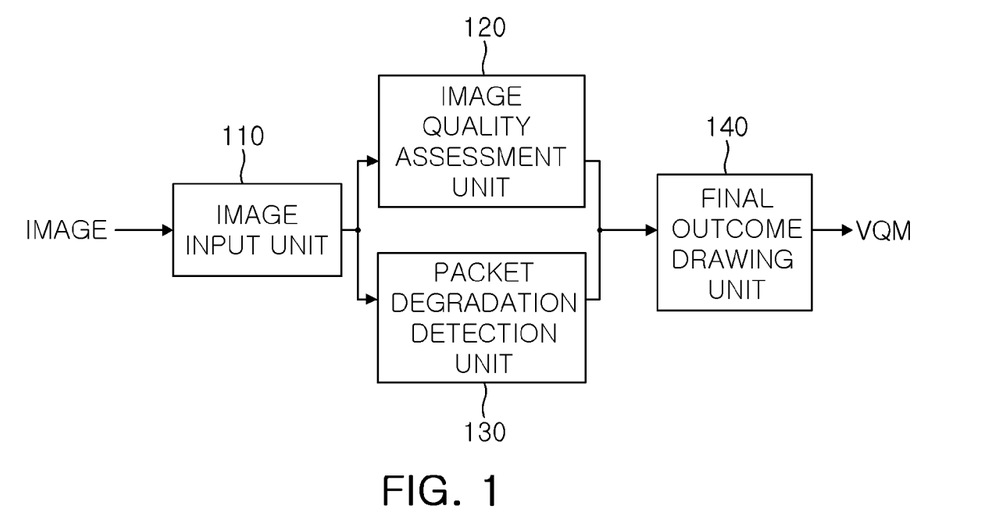
FIG. 1 is a schematic block diagram of an apparatus for assessing image quality in real-time according to an exemplary embodiment of the present invention.

FIG. 1 is a schematic block diagram of an apparatus for assessing image quality in real-time according to an exemplary embodiment of the present invention. The apparatus for assessing image quality in real-time according to an exemplary embodiment of the present invention is an NR (No Reference)-based apparatus for measuring image quality by using only an input image in real-time without an original image.

With reference to FIG. 1, the apparatus for assessing image quality in real-time according to an exemplary embodiment of the present invention includes an image input unit 110, receiving an image whose image quality is to be assessed in real-time, an image quality measurement unit 120, analyzing the image to measure a degradation degree of the image generated in an image processing operation (e.g., compression and pre/post-processing), a packet degradation detection unit detecting a packet error concentratively generated at a portion of the image due to a packet damage or loss generated in an image transmission process; and a final outcome drawing unit finally assessing image quality in consideration of both results measured through the image quality measurement unit 120 and the packet degradation detection unit 130.

For reference, an error generated in the process of image processing operation is generated due to the malfunctioning of a module that compresses and pre/post-processes an image, so the error appears across the entirety of the image. In comparison, a packet error generated in the process of image processing operation is generated when a packet is not received for a certain period of time or when a packet having damaged information is received, so an error having a large value appears to be concentrated in a portion of the image.

Thus, in an exemplary embodiment of the present invention, image degradation generated in the process of the image processing operation and a packet error generated in the process of the image transmission operation are all measured and image quality is finally assessed by using both measurements.

Figure 2:
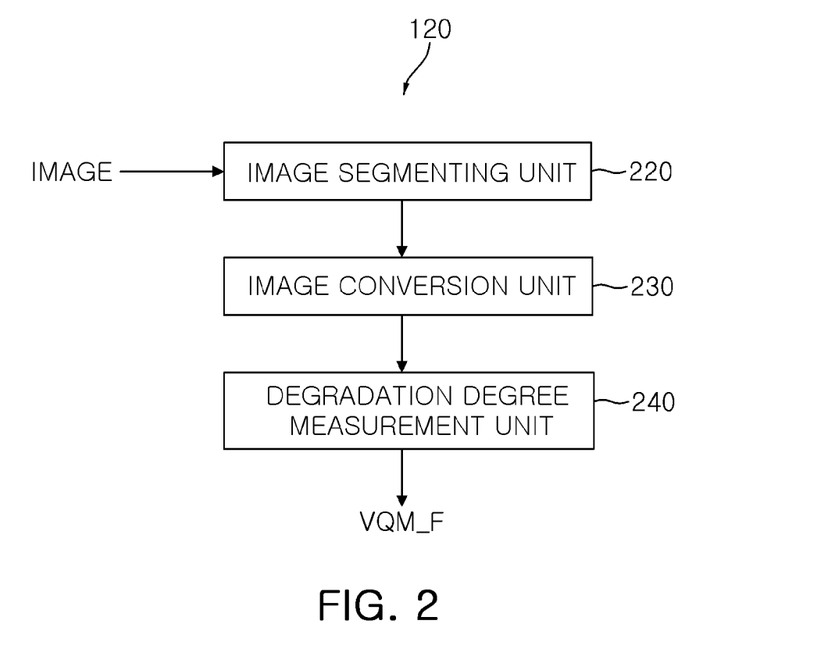
FIG. 2 is a detailed block diagram of an image quality measurement unit according to an exemplary embodiment of the present invention.

FIG. 2 is a detailed block diagram of an image quality measurement unit according to an exemplary embodiment of the present invention.

As shown in FIG. 2, the image quality measurement unit 120 includes an image segmenting unit, an image conversion unit 230, and a degradation degree measurement unit 240.

The image segmenting unit 220 segments an image, which is input through the image input unit 110, by row and column, obtains the difference between a current pixel value and a previous pixel value of each of pixels, and obtains an absolute value of the difference (namely, it obtains a residual of each pixel). The image segmenting unit 220 then segments it in to $2^m$ number of samplings (m is a natural number of 2 or greater).

The image conversion unit 230 performs a Fourier transform on each of the sampling signals output from the image quality measurement unit 120 to convert a signal domain from the image domain into a frequency domain. In this case, the Fourier transformation is represented by Equation 1 shown below:

$$X_k = \sum_{n=0}^{N-1} x_n e^{-\frac{2\pi i}{N}kn}, \quad [\text{Equation 1}]$$

$$k = 0, 1, \ldots, N-1$$

Here, k is the order of image information in the frequency domain, $X_k$ is kth image information expressed in the frequency domain, $x_n$ is nth pixel value in the image domain, and N is the unit used in image segmentation, to which the foregoing sampling number $2^m$ corresponds.

Namely, the image conversion unit 230 serves to convert the signals obtained by segmenting the residual absolute value of each pixel into $2^m$ number of samplings into the frequency domain through Equation 1.

The degradation degree measurement unit 240 accumulates the conversion signals output from the image conversion unit 230 by pixel, and measures a degradation degree of each pixel based on the amplitude of a signal periodically appearing at a point corresponding to $2^m$ according to the accumulation results. The degradation degree measurement unit 240 then averages the degradation degree of the respective pixels by row and column to recognize a total degradation degree (VQM_F) of the entirety of the image.

In this case, in order to accurately measure the degradation degree based on the amplitude of the signal periodically appearing at the point corresponding to $2^m$, a measurement reference value is required. The degradation degree measurement unit 240 measures the amplitude of a signal without degradation to acquire a measurement reference value, and compares the amplitude of the signal periodically appearing at the point corresponding to $2^m$ and the measurement reference value to measure a degradation degree of each pixel. In this case, for reference, the amplitude of the signal without degradation can be measured by using various interpolation methods using an adjacent signal.

Figure 3:
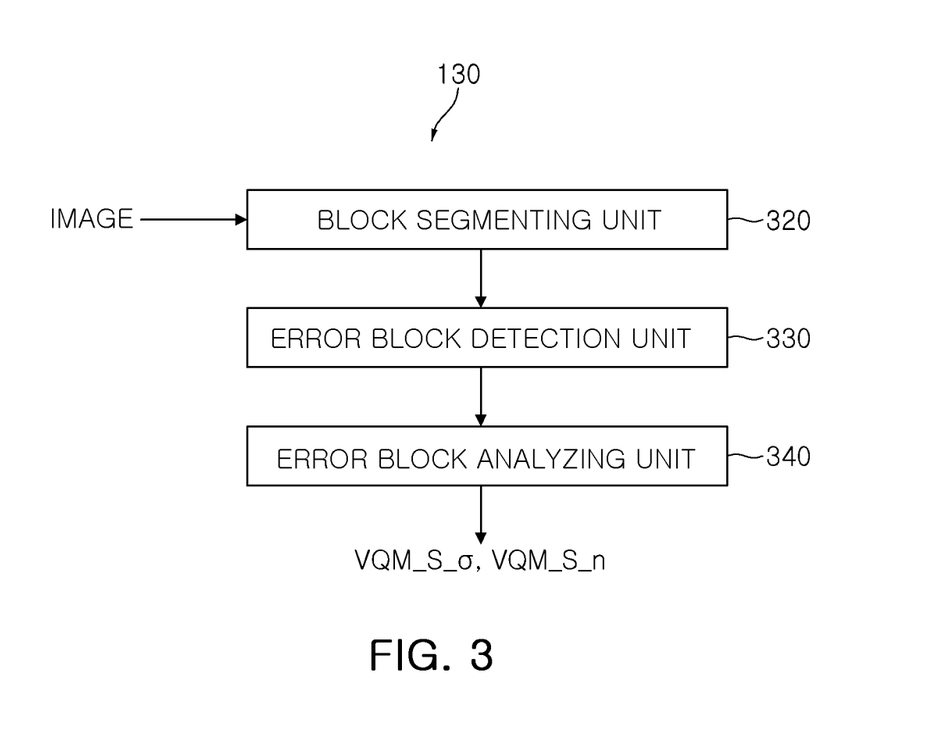
FIG. 3 is a detailed block diagram of a packet degradation detection unit according to an exemplary embodiment of the present invention.

FIG. 3 is a detailed block diagram of the packet degradation detection unit according to an exemplary embodiment of the present invention. As shown in FIG. 3, the packet degradation detection unit 130 includes a block segmenting unit 320, an error block detection unit 330, and an error analyzing unit 340.

In the present exemplary embodiment, the packet degradation detection unit 130 sets an error detection reference value to be relatively high compared with the image quality measurement unit, and detects whether or not a packet degradation has occurred at a portion of an image, to determine whether or not an image has been degraded due to the packet error.

With reference to FIG. 3, the block segmenting unit 320 segments the image input through the image input unit 110 into M×N number of small blocks. In this case, the block segmenting unit 320 may segment the input image into 4×4, 4×8, 8×4, 8×8, 16×8, 8×16, 16×16 number of blocks.

The error block detection unit 330 analyzes each of the blocks obtained by segmenting the image by the block segmenting unit 320 to detect error-generated blocks. The error block detection unit 330 may detect the error blocks through the methods illustrated in FIGS. 5 and 6, details of which will be described hereinafter.

When the error blocks detected by the error block detection unit 330 are concentrated on a portion of the image, namely, when a error block generation pattern corresponds to an error generation pattern due to a packet error, the error block analyzing unit 340 acquires an error block pixel value distribution (VQM_S_σ) and the number of error blocks (VQM_S_η) and outputs the same. To this end, the error block analyzing unit 340 checks the number of error blocks by row and column, obtains an error block pixel value distribution (VQM_S_σ) with respect to the entire row and the entire column, and compares the same with a packet error detection range. According to the comparison results, when it is included in the error block pixel value distribution (VQM_S_σ), the error block analyzing unit 340 confirms that the image has been degraded due to the packet error, acquires the error block pixel value distribution (VQM_S_σ) and the number of error blocks (VQM_S_η), and provides the acquired error block pixel value distribution (VQM_S_σ) and the number of error blocks (VQM_S_η) to the final outcome drawing unit 140.

Then, the final outcome drawing unit 140 receives the degradation degree (VQM_F) of the image output from the image quality measurement unit 120 and the error block distribution value (VQM_S_σ) and the number of error blocks (VQM_S_η) output from the error block analyzing unit 340, and finally assesses the image quality by using Equation 2 or Equation 3 shown below:

$$VQM = \alpha VQM\_F + \beta VQM\_S\_\sigma + \gamma VQM\_S\_\eta \quad [\text{Equation 2}]$$

Here, α, β, and γ are weights.

$$VQM = f_\alpha(VQM\_F) + f_\beta(VQM\_S\_\sigma) + f_\gamma(VQM\_S\_\eta) \quad [\text{Equation 3}]$$

Here, as $f_\alpha$, $f_\beta$, $f_\gamma$, one of various functions such as a polynomial function, an exponential function, a log function, and the like, may be applied.

Figure 4:
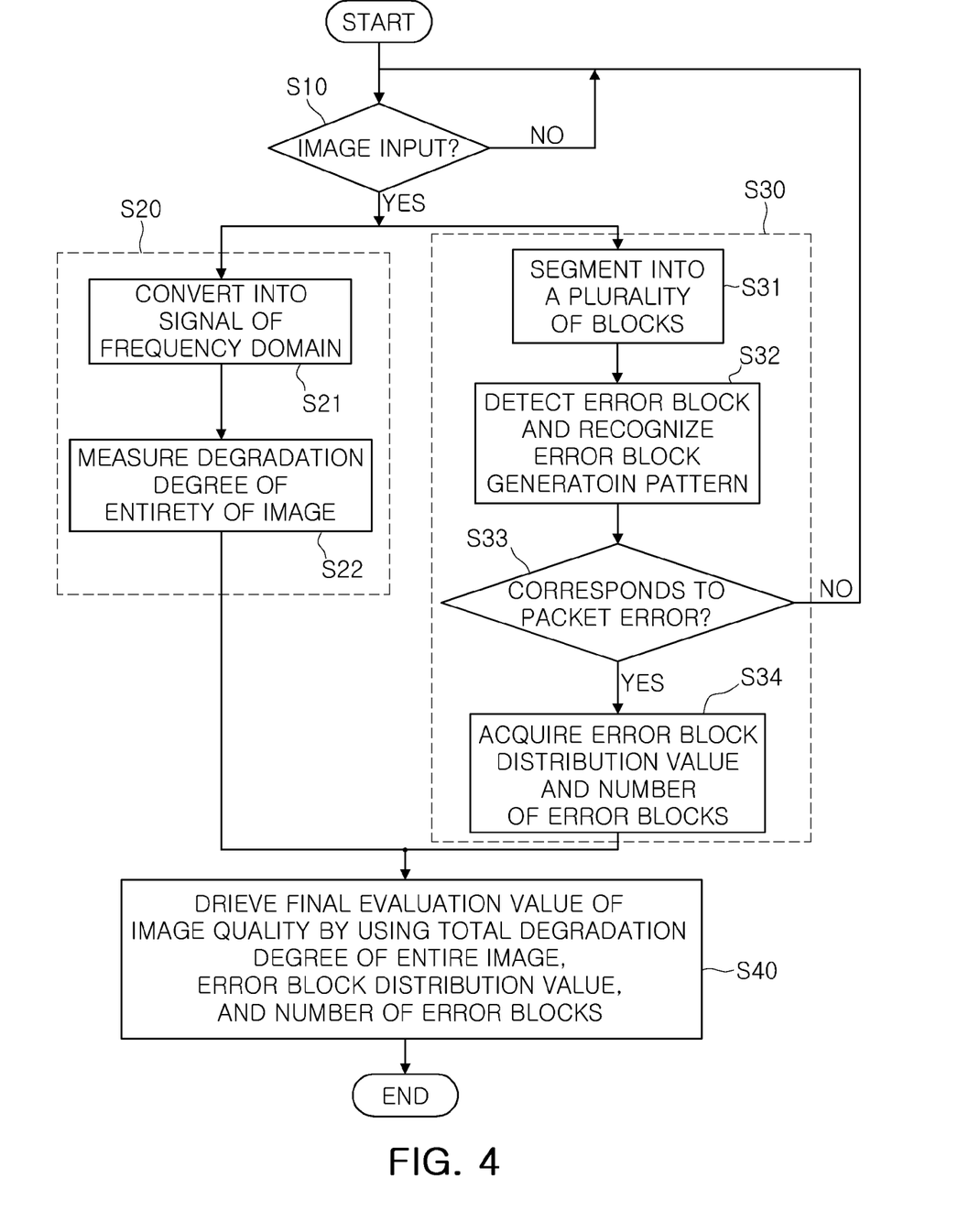
FIG. 4 is a flow chart illustrating the process of a method for assessing multimedia sensory quality in real-time according to an exemplary embodiment of the present invention.

FIG. 4 is a flow chart illustrating the process of a method for assessing multimedia sensory quality in real-time according to an exemplary embodiment of the present invention.

In the present exemplary embodiment, when an image, whose image quality is to be assessed, is input (step S10), an image quality measurement process (step S20) and a packet degradation detection process (step S30) are simultaneously performed.

In the image quality measurement process (step S20), a residual absolute value of each pixel is acquired from the image, segmented into $2^m$ number of samplings, which are then converted into a frequency domain signal (step S21). Degradation degrees of the respective pixels are measured in the frequency domain and averaged to determine a total degradation degree (VQM_S_F) of the entire image (step S22).

In the packet degradation detection process (step S30), the image is segmented into a plurality of blocks (step S31), error blocks are detected, and an error block generation pattern is recognized (step S32). It is checked whether or not the error block generation pattern recognized in step S32 corresponds to an error generation pattern caused by a packet error (step S33). When the error block generation pattern corresponds to an error generation pattern caused by a packet error, an error block distribution value (VQM_S_σ) and the number of error blocks (VQM_S_η) (step S34).

When the image quality measurement process (step S20) and the packet degradation detection unit (step S30) are completed, an image quality final evaluation value VQM is derived by reflecting (or in consideration of) the total degradation degree (VQM_S_F) of the entirety of the image, the error block distribution value (VQM_S_σ) and the number of error blocks (VQM_S_η) acquired in the image quality measurement process (step S20) and the packet degradation detection process (step S30), and output (step S40).

Figure 5:
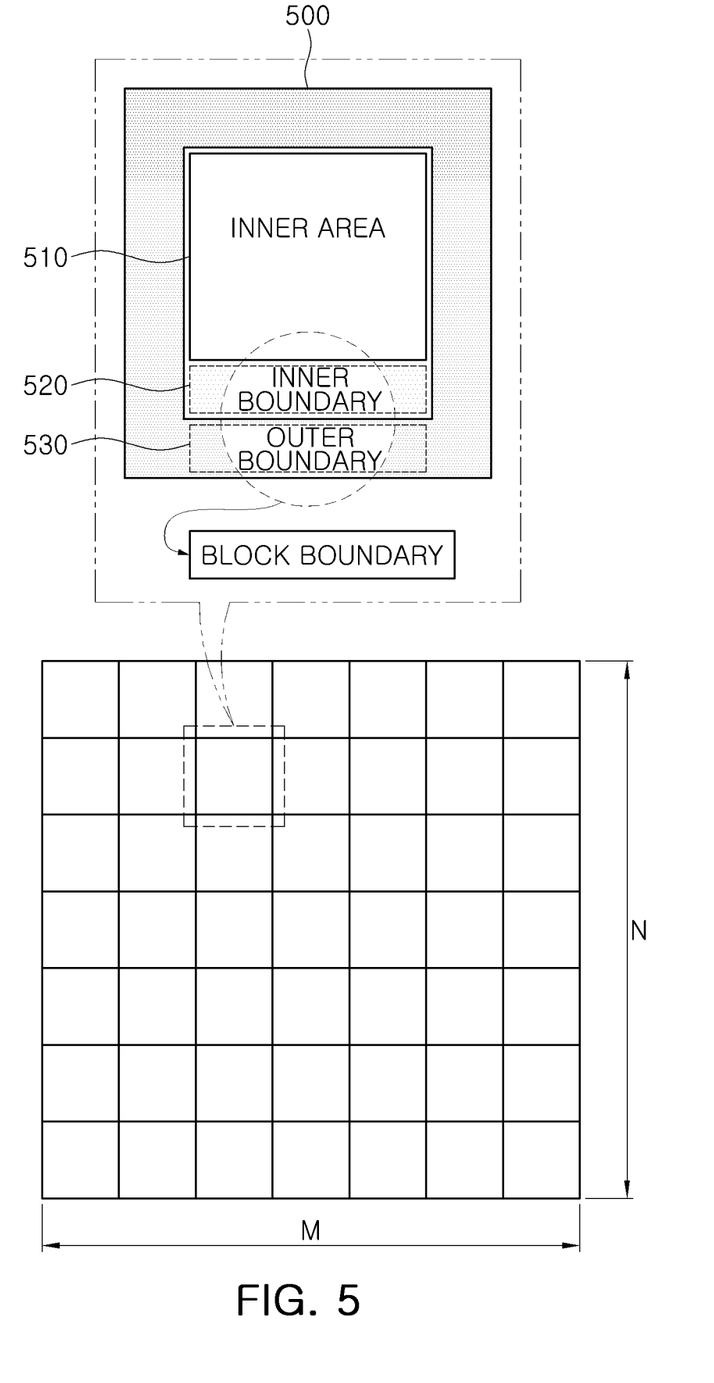
FIG. 5 is a view illustrating the operation of detecting an error block according to an exemplary embodiment of the present invention.

FIG. 5 is a view illustrating the operation of detecting an error block according to an exemplary embodiment of the present invention.

When an image is segmented into M×N number of small blocks, as shown in FIG. 5, the area of each of the blocks 500 includes an inner area 510, an inner boundary 520, and an outer boundary 530. Thus, in an exemplary embodiment of the present invention, whether or not there is a block error at a corresponding boundary is determined by using the statistics of pixel values of the segmented areas.

For reference, when measured in a row direction, the inner area 510 may be available for all of M×1, M×2, ..., M×(N−1), and when measured in a column direction, the inner area 510 may be available for all of N×1, N×2, ..., N×(M−1).

First, a pixel value average for each of the inner area 510, the inner boundary 520, and the outer boundary 530 is obtained. The difference in the pixel value average between the inner boundary and the outer boundary and the difference in the pixel value average between the inner boundary and the inner area are measured, and when the comparison result value is greater than a detection reference value (or threshold value 1), the corresponding block is acquired as an error block.

Similarly, the size of the inner area may vary and the error block detection operation may be performed by using an average distribution.

Namely, a whole pixel value distribution corresponding to the inner area 510 having the same size as that of the inner boundary 520 and a whole pixel value distribution corresponding to the outer boundary 530 having the same size as that of the inner boundary 520 are compared, and if the latter is greater than a detection reference value (or threshold value 2), the corresponding block is acquired as an error block.

Figure 6:
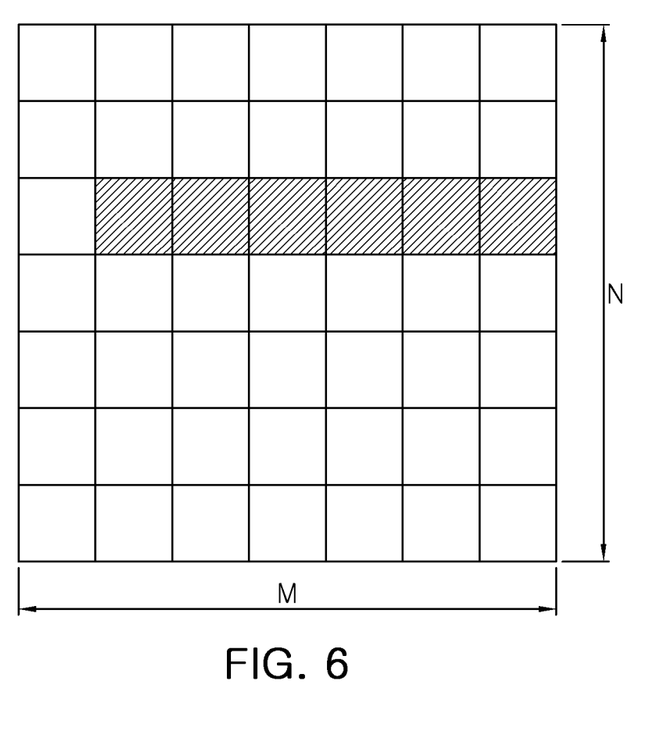
FIG. 6 is a view illustrating an example of an image having a packet error.

Meanwhile, when a packet is lost or damaged because of a problem arising in the image transmission process, a block corresponding to the lost or damaged packet is reconfigured by using image information of an adjacent block as shown in FIG. 6 as it is, so the image having a packet error has the characteristics that blocks having the same image information are continuously generated. In the present exemplary embodiment, an error block detection operation as shown in FIG. 7 may be performed by using such characteristics.

Figure 7:
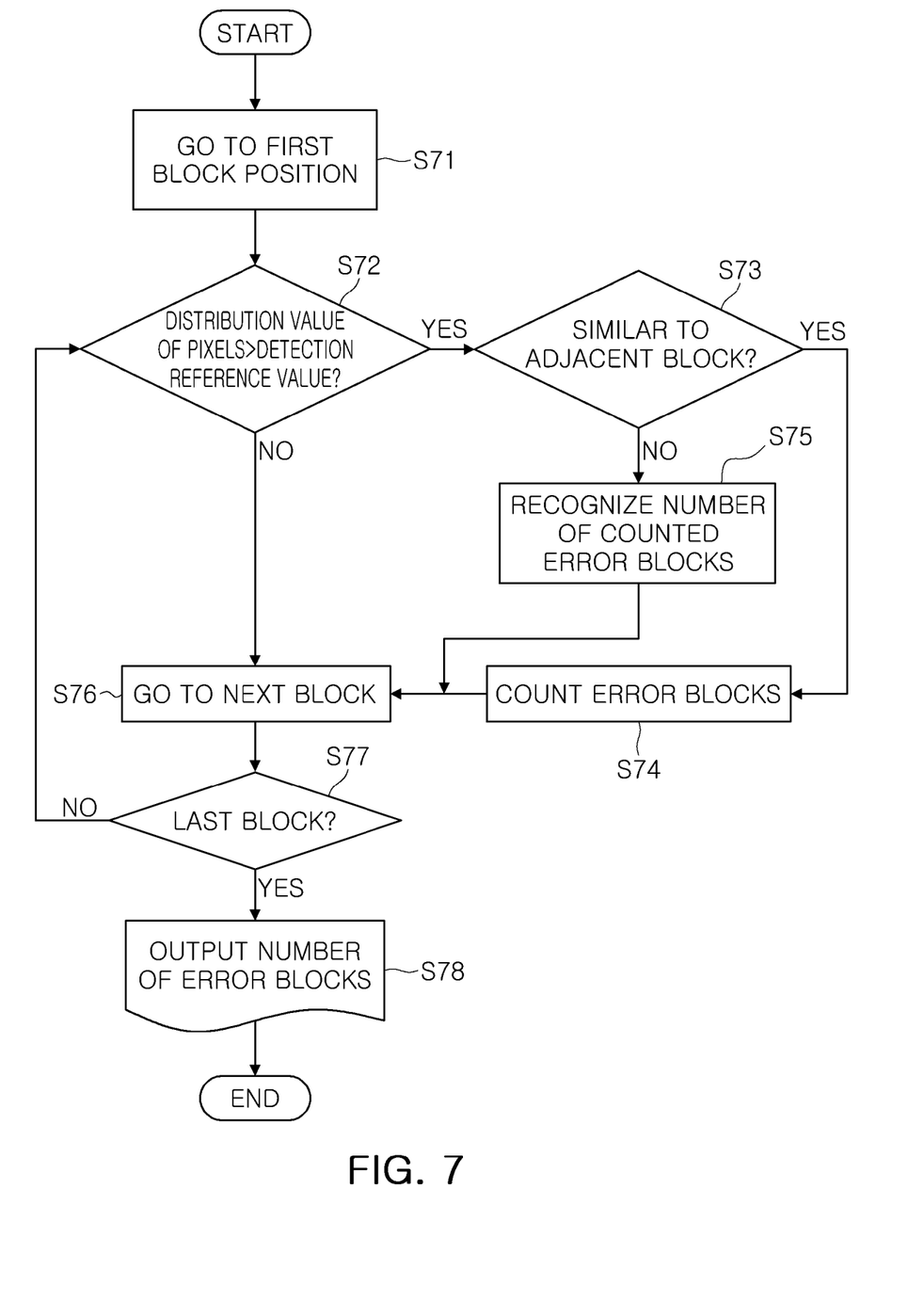
FIG. 7 is a flow chart illustrating an operation of detecting an error block according to another exemplary embodiment of the present invention.

FIG. 7 is a flow chart illustrating an operation of detecting an error block according to another exemplary embodiment of the present invention.

First, a block at an initial position is acquired as a detection target block (step S71), and it is checked whether or not a pixel value distribution included in the detection target block is greater than a detection reference value (or a threshold value 3) (step S72).

In this case, because neighboring blocks are likely to have a similar pixel value distribution in a monotonous area of an image, a block to be checked as to whether or not it is an error block should be determined to have a high pixel value distribution.

If the pixel value distribution included in the detection target block is greater than the detection reference value (or the threshold value 3), a pixel value distribution and a pixel value average of the target block are obtained, and it is checked whether or not the obtained pixel value distribution and the pixel value average of the target block are similar to those of a neighboring block (i.e., a left block or an upper block) (step S73).

When the pixel value distribution and the pixel value average of the target block are similar to those of the neighboring block (i.e., a left block or an upper block) in step S73, in order to determine whether or not such a phenomenon has been caused by a packet error, the corresponding block is detected as an error block, the number of error blocks is counted (step S73), and then goes to a next block (step S76). Namely, it is detected whether or not a packet error continuously occurs in steps S73 and S76.

Meanwhile, when the pixel value distribution and the pixel value average of the target block are different from those of the neighboring block (i.e., a left block or an upper block) in step S73, it is determined that no error block has been generated or a continuous generation of error blocks has been stopped, the number of error blocks counted so far is recognized (step S75), and then goes to the next block (step S76).

The steps S72 to S76 are repeatedly performed on all of the blocks positioned in the same row, and when the final block of the same row is completely inspected, the number of error blocks counted so far is acquired and output (step S77).

The error block detection operation in FIG. 7 relates to one row, and the same method can be applied to the respective columns. When this process is applied to the entirety of the image, the number of times that the same information as that of the neighboring block is repeated by the packet error can be recognized.

As set forth above, according to exemplary embodiments of the invention, because image quality assessment is performed by using only an image itself input in real-time from an external source, the image quality assessment can be processed in real-time.

In addition, in consideration of the fact that a majority of image errors is generated in the process of transmitting an image, a coding error generated in an image processing process and a packet error generated in an image transmission process are measured, and image quality of measured in consideration of both of them. Thus, the measured image quality can have an optimum connectivity with a subject quality assessment through a person. Namely, a higher accuracy of measurement can be provided.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for assessing image quality in real-time, the apparatus comprising:
    an image quality measurement unit measuring image degradation generated in processing an image;
    a packet degradation detection unit detecting a packet error generated in transmitting the image; and
    a final outcome drawing unit finally assessing the quality of the image in consideration of both a degradation degree of the image measured by the image quality measurement unit and the packet error measured by the packet degradation detection unit.

2. The apparatus of claim 1, wherein the image quality measurement unit comprises:
    an image segmenting unit obtaining a residual absolute value of each pixel from the image and segmenting the same into $2^m$ number of samplings (m is a natural number of 2 or greater);

an image conversion unit converting the segmented signals output from the image segmenting unit into signals of a frequency domain; and a degradation degree measurement unit measuring a degradation degree of each pixel through the converted signals output from the image conversion unit and averaging the same to measure a degradation degree of the image.

3. The apparatus of claim 2, wherein the image conversion unit performs a Fourier transform on each of the sampling signals to convert the signal domain of the segmented signal from the image domain to a frequency domain.

4. The apparatus of claim 2, wherein the degradation degree measurement unit accumulates the converted signals by pixel, measures a degradation degree of each pixel through the amplitude of the accumulated signals at a point corresponding to $2^m$, and averages them to determine a degradation degree of the image.

5. The apparatus of claim 1, wherein the packet degradation detection unit comprises:
   a block segmenting unit segmenting the image into a plurality of blocks;
   an error block detection unit detecting a block having an error among the plurality of blocks; and
   an error block analyzing unit acquiring and outputting an error block pixel value distribution and the number of error blocks when a generation pattern of the error blocks detected by the error block detection unit corresponds to an error generation pattern caused by a packet error.

6. The apparatus of claim 5, wherein the error block detection unit detects a block in which the difference in a pixel value average between an inner boundary and an outer boundary is greater than a detection reference value compared with the difference in a pixel value average between the inner boundary and an inner area, and acquires the detected block as an error block.

7. The apparatus of claim 5, wherein the error block detection unit detects a block in which a pixel value distribution corresponding to an outer boundary having the same size as that of an inner boundary is greater than a detection reference value compared with a pixel value distribution corresponding to an inner area having the same size as that of the inner boundary, and acquires the detected block as an error block.

8. The apparatus of claim 5, wherein the error block detection unit detects a block in which a pixel value distribution is greater than the detection reference value and the pixel value distribution and a pixel value average are the same as those of a neighboring block, and acquires the detected block as an error block.

9. The apparatus of claim 8, wherein the error block analyzing unit checks the number of error blocks by row and by column and acquires an error block pixel value distribution with respect to the entire rows and entire columns, and when the error block pixel value distribution is included in a packet error detection range, the error block analyzing unit determines that an image has been degraded due to a packet error, acquire the number or error blocks, and outputs the same.

10. A method for measuring image quality in real-time, the method comprising:
    measuring image degradation generated in processing an image;
    detecting a packet error generated in transmitting the image; and
    finally assessing the quality of the image in consideration of both a degradation degree of the image and the packet error.

11. The method of claim 10, wherein the measuring of the image degradation comprises:
    obtaining a residual absolute value of each pixel from the image, sampling the residual absolute value of each pixel in $2^m$ (m is a natural number of 2 or greater) number of values, and converting the same into signals of a frequency domain; and
    measuring a degradation degree of each pixel from the signals which have been converted into the frequency domain and averaging them to acquire a degradation degree of the image.

12. The method of claim 10, wherein the detecting of the packet error comprises:
    segmenting the image into a plurality of blocks and detecting an error block; and
    when a generation pattern of the error blocks corresponds to an error generation pattern due to a packet error, acquiring an error block pixel value distribution and the number of error blocks, and outputting the same.

13. The method of claim 12, wherein the detecting of the error block comprises:
    obtaining a pixel value average of each of an inner area, an inner boundary area, and an outer boundary area of each block;
    comparing the difference in the pixel value average between the inner boundary area and the outer boundary area and the difference in the pixel value average between the inner boundary area and the inner area, and detecting a block having a difference greater than a detection reference value;
    acquiring the detected block as an error block.

14. The method of claim 12, wherein the detecting of an error block comprises:
    acquiring a pixel value distribution corresponding to an outer boundary area having the same size as that of the inner boundary area and a pixel value distribution corresponding to an inner area having the same size as that of the inner boundary area, among the inner area, the inner boundary area, and the outer boundary area by block;
    comparing the pixel value distribution corresponding to an outer boundary area having the same size as that of the inner boundary area and the pixel value distribution corresponding to an inner area having the same size as that of the inner boundary area to detect a block in which the pixel value distribution is greater than a detection reference value; and
    acquiring the detected block as an error block.

15. The method of claim 12, wherein the detecting of the error block comprises:
    obtaining a pixel value distribution included in a detection target block;
    when the distribution is grater than the detection reference value, obtaining a pixel value distribution and a pixel value average of the detection target block and comparing them with a neighboring block;
    when the obtained pixel value distribution and the pixel value average of the detection target block are similar to the neighboring block, detecting the detection target block as an error block.

16. The method of claim 15, wherein the detecting of the error block is repeatedly performed by column and row of the entirety of an image.

* * * * *